(12) United States Patent
Tresidder et al.

(10) Patent No.: US 12,147,366 B2
(45) Date of Patent: Nov. 19, 2024

(54) DROOP MITIGATION FOR AN INTER-CHIPLET INTERFACE

(71) Applicant: Advanced Micro Devices, Inc., Santa Clara, CA (US)

(72) Inventors: Michael J. Tresidder, Austin, TX (US); Benjamin Tsien, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 198 days.

(21) Appl. No.: 17/853,812

(22) Filed: Jun. 29, 2022

(65) Prior Publication Data
US 2024/0004821 A1 Jan. 4, 2024

(51) Int. Cl.
*G06F 13/40* (2006.01)
*G06F 1/26* (2006.01)

(52) U.S. Cl.
CPC ............ *G06F 13/4004* (2013.01); *G06F 1/26* (2013.01); *G06F 2213/40* (2013.01)

(58) Field of Classification Search
None
See application file for complete search history.

(56) References Cited

U.S. PATENT DOCUMENTS

2022/0199142 A1\* 6/2022 Mathiyalagan ........ G11C 5/147
2022/0413593 A1\* 12/2022 Kakkireni ............. G06F 1/3296

\* cited by examiner

*Primary Examiner* — Farley Abad
*Assistant Examiner* — Dayton Lewis-Taylor
(74) *Attorney, Agent, or Firm* — Volpe Koenig

(57) ABSTRACT

Systems and methods are disclosed for voltage droop mitigation associated with a voltage rail that supplies power to circuitry of a chiplet. Techniques disclosed include detecting an upcoming transmission of data packets that are to be transmitted through a physical layer of the chiplet. Then, before transmitting the data packets through the physical layer, throttling a rate of bandwidth utilization in the physical layer and transmitting, by the controller, the data packets through the physical layer.

20 Claims, 3 Drawing Sheets

DETECT AN UPCOMING TRANSMISSION OF DATA PACKETS, TO BE TRANSMITTED THROUGH A PHYSICAL LAYER OF A CHIPLET
310

THROTTLE A RATE OF BANDWIDTH UTILIZATION IN THE PHSYCAL LAYER OF THE CHIPLET
320

TRANSMIT THE DATA PACKETS THROUGH THE PHYSICAL LAYER
330

DROOP MITIGATION FOR AN INTER-CHIPLET INTERFACE

BACKGROUND

A recent trend in chip design is a system architecture that is constructed of multiple chiplets on a package. A system of multiple chiplets offers modularity and flexibility in manufacturing. The distribution of system functionality into several chiplets improves yield compared to integrating the same functionality into one large monolithic chip. Central to a multiple chiplet design is an inter-chiplet interface. Multiple chiplet systems use data links, including, for example, an ultra-short-reach (USR) interconnect that connects between the physical layers of the chiplets' interfaces.

BRIEF DESCRIPTION OF THE DRAWINGS

A more detailed understanding may be had from the following description, given by way of example in conjunction with the accompanying drawings wherein.

DETAILED DESCRIPTION

Figure 1:
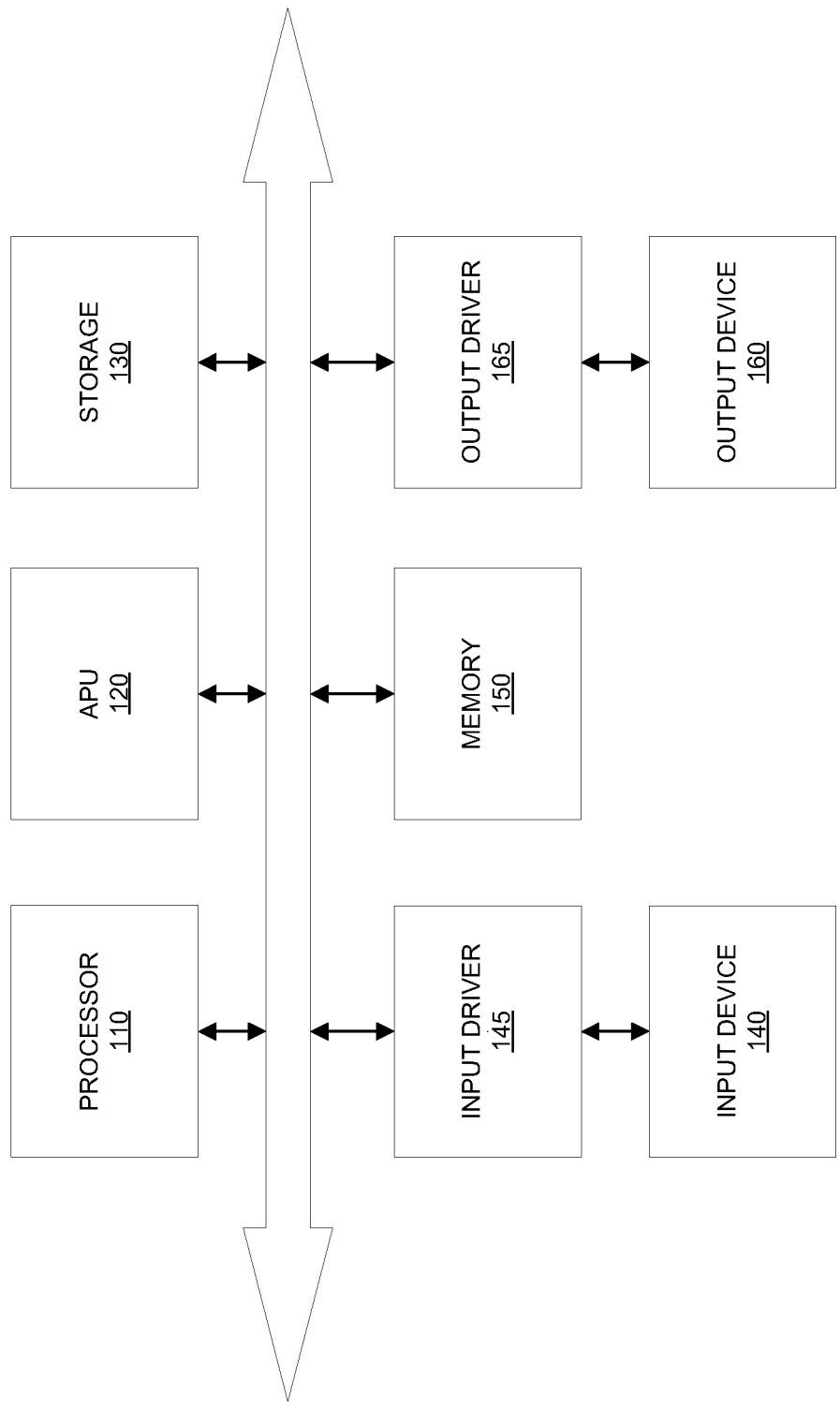
FIG. 1 is a block diagram of an example system, based on which one or more features of the disclosure can be implemented.

The inter-chiplet interface is designed to meet system requirements of power efficiency, bandwidth efficiency, and low latency. Pipelined processing in multiple chiplet systems, for example, often requires transferring large amounts of data between chiplets that can cause sharp variations in bandwidth utilizations during data transmissions across the data link, and thus sharp variations in current draw. Features of the present disclosure address provide systems and methods which efficiently address these sharp variations in current draw to mitigate voltage droops on voltage rails local to corresponding chiplets.

Systems and methods are disclosed for controlling voltage droop caused by traffic between chiplets that are communicatively connected via a data link. Techniques disclosed include detection of upcoming data packets, from a data fabric (transport layer) of a chiplet, that are to be transmitted to another chiplet via the data link. To prevent a sudden increase in power consumption that can lead to a damaging voltage droop, before the data packets reach the physical layer of the chiplet, the bandwidth utilization can be throttled. In one approach, circuitry is activated (enabled) and/or switching activity is increased to ramp the current draw toward the anticipated current draw when data-packets are transmitted over the physical layer. Such current ramping spreads the change in current draw over time. In another approach, the data packets can also be staged out (transmitted at a gradually increasing rate) through the physical layer of the chiplet to slow the rate of current draw increase.

Aspects of the present disclosure describe method for controlling a voltage droop mitigation of a chiplet. The method comprises detecting an upcoming transmission of data packets to be transmitted through a physical layer of the chiplet, throttling a rate of bandwidth utilization in the physical layer and transmitting, by the controller, the data packets through the physical layer.

Aspects of the present disclosure also describe a system for controlling a voltage droop mitigation of a chiplet. The system comprises a chiplet comprising circuitry of a physical layer, a voltage rail configured to supply power to the circuitry and a controller configured to detect an upcoming transmission of data packets to be transmitted through the physical layer of the chiplet, throttle a rate of bandwidth utilization in the physical layer and transmit the data packets through the physical layer.

Further aspects of the present disclosure describe a non-transitory computer-readable medium comprising hardware description language instructions for causing a computer to perform a method for controlling a voltage droop mitigation of a chiplet. The instructions comprise detecting an upcoming transmission of data packets to be transmitted through a physical layer of the chiplet, throttling a rate of bandwidth utilization in the physical layer and transmitting the data packets through the physical layer.

FIG. 1 is a block diagram of an example system 100. The system 100 can be associated with, for example, a computer, a gaming device, a handheld device, a set-top box, a television, a mobile phone, or a tablet computer. The system 100 can include a processor 110, an accelerated processing unit (APU) 120, storage 130, an input device 140, memory 150, and an output device 160. The system 100 can also include an input driver 145 and an output driver 165. The processor 110 and the APU 120 can represent one or more cores of central processing units (CPUs) and one or more cores of APUs, respectively. The memory 150 can represent volatile or non-volatile memory, including random-access memory (RAM), SRAM, dynamic random-access (DRAM), a cache, or a combination thereof. The processor 110, the APU 120, and the memory 150, or a subset thereof, may be located on the same die or on separate dies. In an aspect, the system 100 can include additional components not shown in FIG. 1.

The APU 120 can represent a graphics processing unit (GPU), that is, a shader system comprising one or more computing units that are configured to perform computations in parallel, for example, in accordance with a single instruction multiple data (SIMD) paradigm. The APU 120 can be configured to accept compute commands and graphics rendering commands from the processor 110, to process those compute and graphics rendering commands, and/or to provide output to a display (the output device 160). In alternative aspects, the APU 120 can be employed to perform signal processing operations (e.g., when embodied in a digital signal processor (DSP)), to perform accelerated operations through the use of a field programmable gate array (FPGA) configured by a bitstream, to perform neural processing operations through the use of a neural processing unit (NPU), or to perform other operations that may be more efficiently performed through the use of an accelerated processing unit rather than by processor 110.

The storage 130 can include fixed or removable storage, for example, a hard disk drive, a solid-state drive, an optical disk, or a flash drive. The input device 140 can represent, for example, a keyboard, a keypad, a touch screen, a touch pad, a detector, a microphone, an accelerometer, a gyroscope, a biometric scanner, or a network connection (e.g., a wireless local area network card for receipt of wireless IEEE 802 signals). The output device 160 can represent, for example, a display, a speaker, a printer, a haptic feedback device, one or more lights, an antenna, or a network connection (e.g., a wireless local area network card for transmission of wireless IEEE 802 signals). In an aspect, the input driver 145 communicates with the processor 110 (or the APU 120) and the input device 140, and facilitates the receiving of input from the input device 140 to the processor 110 (or the APU 120). In another aspect, the output driver 165 communicates with the processor 110 (or the APU 120) and the output device 160, and facilitates the sending of output from the processor 110 (or the APU 120) to the output device 160.

Figure 2:
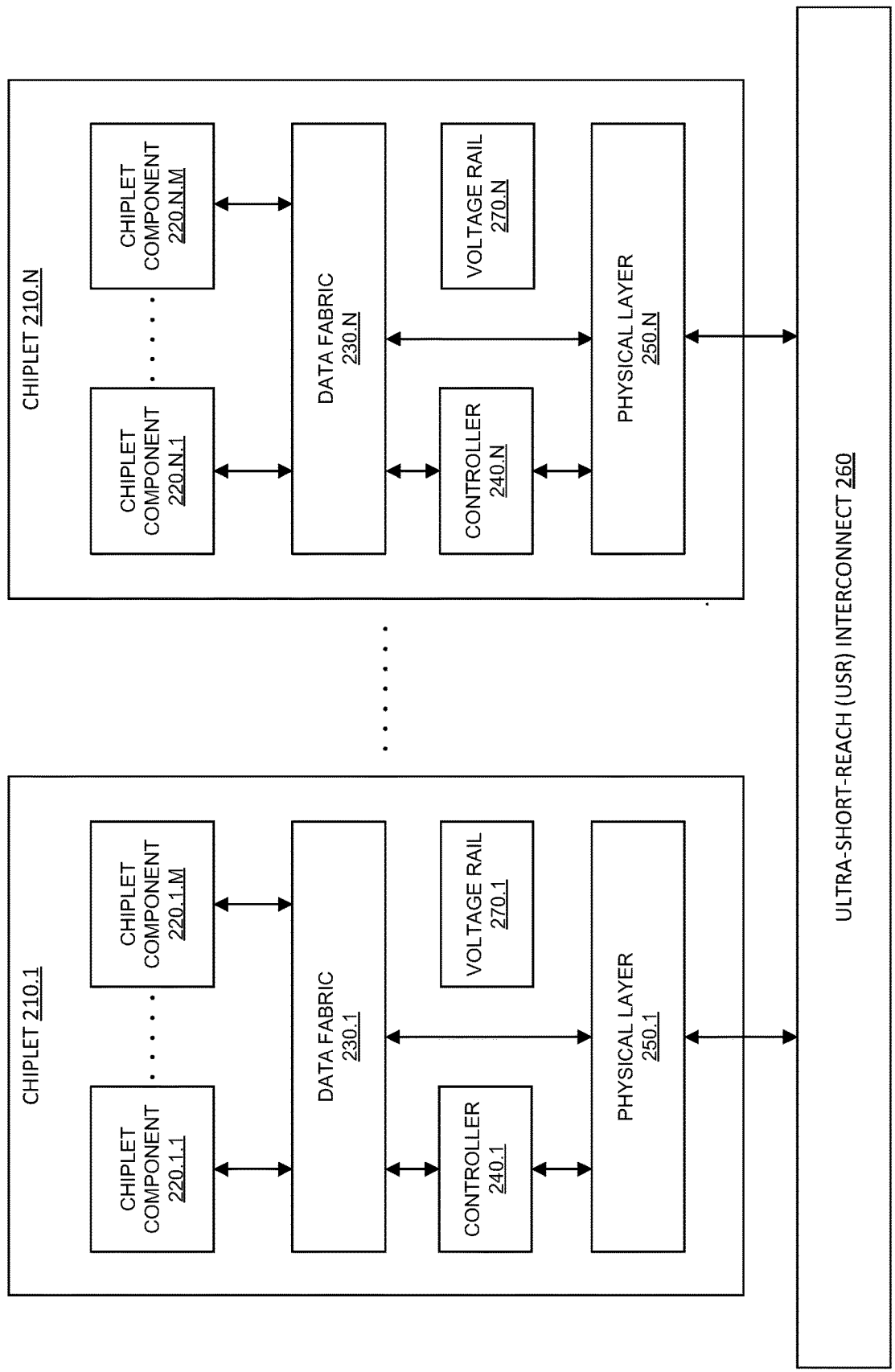
FIG. 2 is a block diagram of an example multiple chiplet system, based on which one or more features of the disclosure can be implemented.

FIG. 2 is a block diagram of an example multiple chiplet system 200. The chiplets 210.1-N (or 210) of the system 200 include integrated circuits that perform different or duplicated functions. A chiplet 210 of the system 200 can, for example, implement the functionality of an APU and/or a processor (e.g., the APU 120 and the processor 110 of FIG. 1) or a sub-component of such functionality. As illustrated in FIG. 2, the chiplets 210 comprise respective chiplet components 220.1.1-M, . . . , 220.N.1-M (or 220), data fabrics 230.1-N (or 230), controllers 240.1-N (or 240), voltage rails 270.1-N (or 270), and physical layers 250.1-N (or 250). The chiplet components 220 contain circuitry that implements one or more chiplet functions. Chiplet components, e.g., 220.1.1-M of chiplet 210.1, can communicatively connect with each other and with memory (e.g., the memory 150 of FIG. 1) using the chiplet's data fabric 230.1. The chiplets' data fabrics 230 also represent transport layers that facilitate inter-chiplet communication via a USR interconnect 260. For example, a data packet, to be transmitted from component 220.1.1 to component 220.N.1, can travel through a data link, including data fabric 230.1, physical layer 250.1, USR interconnect 260, physical layer 250.N, and data fabric 230.N. In an aspect, a data fabric, e.g., 230.1, can represent multiple data fabrics and/or one or more control fabrics.

Hence, the transmission of data packets among the chiplets 210 and through the USR interconnect 260 is facilitated by respective physical layers 250. Generally, a physical layer contains switching circuitry that generates the transmission signals (sent to the USR interconnect 260) that carry the information in data packets to be transmitted. In an aspect, the physical layers 250 are controlled by their respective controllers 240. The controllers 240 are configured to activate the switchers of respective physical layers 250 to enable the transmission of signals out of the respective physical layers 250. Activated switchers of a physical layer 250 draw current from the respective voltage rail 270 that supplies power to circuitry of the physical layer. That is, the more data packets are to be transmitted through the physical layer 250 of a chiplet 210, the higher is the switching activity that generates the corresponding transmission signals, and the more current is drawn from the respective voltage rail 270 by the switching circuitry.

The voltage rails 270 are configured to supply power to circuitry of their respective chiplets 210, including respective physical layers 250. Typically, each voltage rail 270 is inductively isolated from the power supplier (e.g., a voltage regulator) it is connected to (not shown). Thus, when an increase in current draw ensues, current is first drawn from the local capacitive storage of the voltage rail 270 and, ultimately, from the power supplier of the voltage rail. Consequently, voltage droops (caused by a sudden increase in current draw) will be quickly observed on the voltage rail 270 before impacting circuitry of the power supplier. The magnitude of the voltage droop observed on the voltage rail 270 is proportional to the magnitude of the change in current draw i over time t (i.e., di/dt) in relation to the amount of local capacitive storage.

When digital circuitry is exposed to reduced voltages, the functional behaviors of the digital circuitry are slowed. A sufficiently large voltage droop can cause digital circuitry to be unable to meet functional timing requirements. thereby resulting in impairment of its functionality and/or corruption of its state. One technique for mitigating such impairment is to raise the voltage applied by the power supplier. This mitigation technique, however, raises the average voltage under normal operating conditions thereby elevating the power dissipated under normal operating conditions. Additionally, if the magnitude of the local voltage droop is excessive, elevating the applied voltage to mitigate the voltage droop can require the application of a voltage that, under normal operating conditions, exceeds the reliability limits for the affected circuits. Consequently, merely elevating the voltage to provide more margin against such voltage droop phenomena may not provide a practical solution. Additionally, some circuits (such as those used in physical layer data transmission) expect narrow ranges in their dynamic operating voltage to ensure that linearity is maintained and/or the circuit characteristics remain within an expected operating range. Excessive, transient voltage fluctuations can cause the circuitry to temporarily operate outside of its intended operating range, again resulting in impairment of the digital data and/or state. Techniques described herein can mitigate such voltage droops to prevent damage to and/or functional impairment of the circuitry powered by the voltage rails 270.

Communications among chiplets, as described above, can exhibit abrupt changes in bandwidth utilizations. Consequently, an upcoming stream of data packets from a chiplet component 220 can cause circuitry in the respective physical layer 250, that may be in an idle (inactive) state at the time, to suddenly draw large amounts of current from the chiplet's voltage rail 270. This sudden increase in drawn current can cause a voltage droop that may damage circuitry of the voltage rail 270. To mitigate damaging voltage droops, throttling of the rate of bandwidth utilization can be performed. Features of the present disclosure throttle the rate of bandwidth utilization.

In a first approach of throttling the rate of bandwidth utilization, the upcoming data packets are staged out, so that the power their transmission consumes will increase gradually. A second approach of throttling the rate of bandwidth utilization is to gradually increase power consumption by the physical layer so that it reaches the power level that will be consumed by the data packets when they are transmitted by the physical layer. The latter approach is advantageous, as it is transparent to chiplet communication (that is, it does not disturb the flow of data packet transmission).

In the first approach, the transmission of the data packets is staged out. That is, the controller 240 is configured to slowly increase the enabling of physical layer 250 circuitry and/or the transmission rate of the data packets through the physical layer 250, so that bandwidth utilization in the physical layer 250, and, therefore, power consumption (or current drawn) from the voltage rail 270, increases gradually. However, staging out (decreasing or slowing) the rate of transmission of data packets introduces communication latency, and, thus, this approach is typically suitable for cases where communication latency can be tolerated.

In the second approach, enabling of the physical layer 250 circuitry and/or staging of switching activity to mimic bandwidth utilization in the physical layer 250 is manipulated before, and, optionally, after the transmission of the data packets. Thus, in anticipation of an upcoming stream of data packets from the data fabric 230, the physical layer's power consumption is gradually increased, so that by the time the data packets reach the physical layer, transmitting the data packets by the physical layer will not cause a large, sudden change in current draw that may result in a voltage droop that, in turn, can damage circuitry or impair functional operation of the circuitry powered by voltage rail 270. This approach relies on the detection of upcoming data packets from the data fabric 230 and on an available mechanism to gradually increase the power consumed (or current drawn) by the physical layer so that it is close to the power that will be consumed (or the current that will be drawn) by the upcoming data packets.

In an aspect, the controller 240 is configured to detect that a burst of data packets is to be outputted by the data fabric 230 to be fed to the physical layer 250. For example, the controller 240 can be informed by the data fabric 230 of such upcoming event, as the data fabric 230 is typically aware of the pattern of traffic. Thus, the data fabric 230 can alert the controller 240 of upcoming data packets. The data fabric 230 can also indicate the traffic rate of these upcoming data packets. Once a detection of upcoming data packets occurs, the controller 240 can gradually increase the amount of current that is presently drawn from the voltage rail 270 to the physical layer 250 circuitry to a level that is closer to the current that will be eventually drawn to carry out the transmission of the upcoming data packets. That level can be determined based on an expected traffic rate of the upcoming data packets (e.g., as reported by the data fabric).

To gradually increase the amount of current that is presently drawn from the voltage rail 270, the controller 240 can enable (or activate) physical layer circuitry. For example, the controller 240 can generate dummy data packets at a growing switching rate to cause a gradual power consumption increase prior to the commencement of genuine data-packet transmission. To that end, in a calibration phase, the controller 250 can measure the minimum and the maximum power consumed by the physical layer 250 by measuring the power consumed when all switching circuitry are off and by measuring the power consumed when all switching circuitry are on, respectively. In an operational phase, when no transmission is taking place, there is no switching activity in the circuitry of the physical layer 250: no current is drawn out of the voltage rail 270 and power consumption is minimal. To gradually increase the power consumption, the controller 240 can start by simulating, for example, a 10% switching activity level—effectively transmitting dummy data packets that cause switching activity, thereby, increasing power consumption by 10% of the maximum power consumption. The controller 240 can then continue with simulating, for example, an additional 10% of switching activity level, increasing power consumption by another 10% of the maximum power consumption. This process can continue, for example, until the level of power consumption reaches the level of power consumption that is expected of the upcoming data packets. When the data packets from the data fabric 230 arrive at the physical layer, simulation is concluded (transmission of dummy data packets is stopped) and the transmission of the arrived data packets is carried out by the physical layer.

The gradual increase in power consumption prevents sudden increases in the amount of current drawn from the voltage rail and mitigates the resulting voltage droop that could otherwise damage the voltage rail and related circuitry or otherwise impair functional operation of the circuitry powered by voltage rail 270. In cases where it is likely that a first burst of data packets from the data fabric 230 will be followed by one or more bursts of data packets, it is advantageous to maintain the level of power consumption consumed by the first burst of data packets for a predetermined duration of time. This way, the subsequent bursts of data packets will not cause sudden increases in the amount of current drawn from the voltage rail, and voltage droop will be further mitigated. Maintaining the level of power consumption consumed by the first burst of data packets can be done by the controller 240 by following the transmission of the first burst of data packets with a transmission of dummy data packets at a similar rate for a predetermined duration of time.

Figure 3:
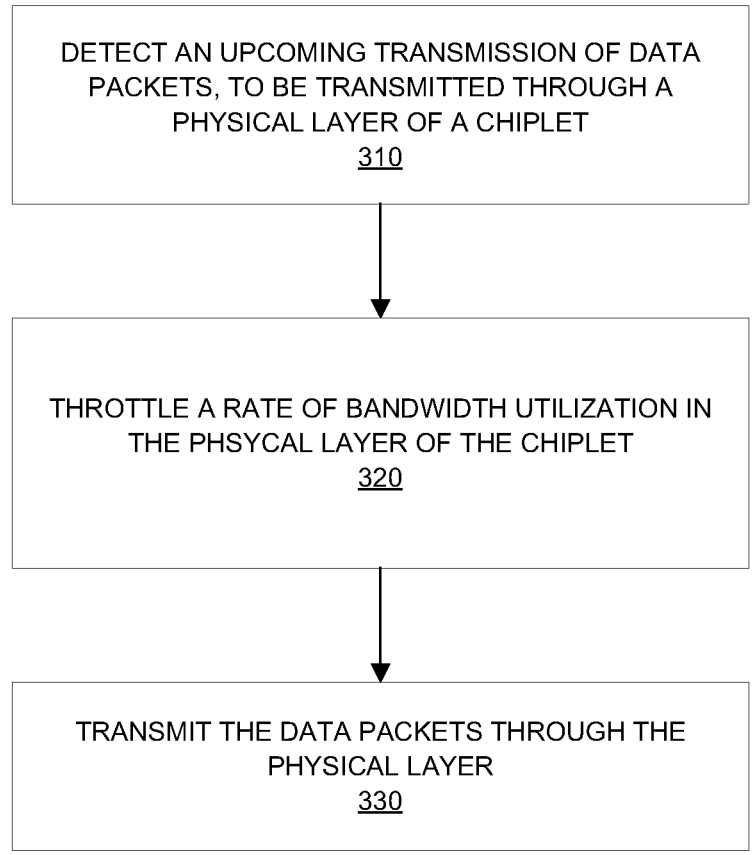
FIG. 3 is a flowchart of an example method for voltage droop mitigation, based on which one or more features of the disclosure can be implemented.

FIG. 3 is a flowchart of an example method 300 for voltage droop mitigation. The voltage droop mitigation method 300 is associated with a voltage rail 270 that supplies power to a chiplet 210. The method 300 begins, in step 310, with detecting, by a controller 240 of the chiplet 210, upcoming transmission of data packets. For example, these data packets can be part of a communication between one chiplet 210.1 and another chiplet 210.N via the USR interconnect 260, and be transmitted from the data fabric 230.1 of the one chiplet 210.1 through its physical layer 250.1. In step 320, before the transmission of the data packets through the physical layer, a rate of bandwidth utilization in the physical layer of the chiplet 210 is throttled. The throttling includes, for example, staging out transmission of the data packets through the physical layer by at least one of enabling of a portion of circuitry of the physical layer and increasing a transmission rate of the data packets through the physical layer. A switching activity is, for example, generated by the controller 240 of the chiplet before the transmission of the data packets through the physical layer. The generated switching activity can be switching activity in the circuitry of the physical layer 250 that is associated with transmission of dummy data packets through the physical layer. Then, in step 330, the data packets are transmitted through the physical layer 250. Consequently, the difference between: the current drawn from the voltage rail by a switching activity associated with the transmission (in step 330) of the data packets and the current drawn from the voltage rail by the generated (in step 320) switching activity is kept below a predetermined threshold. In a following step, the method 300 can further generate, by the controller 250, another activity associated with the transmission of other dummy data packets through the physical layer 250. This generated activity can last throughout a predetermined time duration after the transmission of the data packets.

In step 320 of the method 300, generating the switching activity include increasing the switching activity of the circuitry of the physical layer to cause a gradual increase in the drawing of current. That is, a stepped increase in drawing of current from the local capacitive storage of the voltage rail 270 (that supplies power to the physical layer 250) and, ultimately, from the voltage supplier of the voltage rail 270. The gradual increase in the drawing of current can be up to a predetermined percentage of the current drawn when transmitting the upcoming data packets through the physical layer 250. Alternatively, the gradual increase in drawing of current from the voltage rail 270 can be up to a predetermined percentage of the current drawn at a maximum power that can be consumed by the circuitry of the physical layer 250. In an aspect, causing a gradual increase over time in the drawing of current can be achieved by turning on circuitry that starts the draw of current or sending dummy data packets with a modeled switching activity, or a combination thereof.

Alternatively, or in addition, to the method 300, droop mitigation at the interface of the chiplet can be performed by changing the rate in which data packets are transmitted through the physical layer 250. To that end, the controller 240 can be configured to stage out the transmission of the data packets through the physical layer, where the rate of transmission of the data packets is gradually increased. This staging out of the transmission of the data packets can be performed in multiple stages. In each stage, a portion of the data packets is transmitted at a rate that causes a time-averaged power consumption of a predetermined percentage of the maximum power consumption. For example, in a first stage, the data packets are transmitted at a rate that causes power consumption at 10% of the maximum power consumption; in a second stage, the data packets are transmitted at a rate that causes power consumption at 20% of the maximum power consumption; and so on, until, for example, the rate reaches the rate in which the data packets would have been transmitted without intervention (that is, without staging).

It should be understood that many variations are possible based on the disclosure herein. Although features and elements are described above in particular combinations, each feature or element can be used alone without the other features and elements or in various combinations with or without other features and elements.

The methods provided can be implemented in a general-purpose computer, a processor, a processor core, or a data-movement engine. Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such as instructions capable of being stored on a computer readable media). The results of such processing can be mask works that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general-purpose computer, a processor, or a hardware finite state machine. Examples of a non-transitory computer-readable medium include read only memory (ROM), random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for controlling a voltage droop mitigation of a chiplet, the method comprising:
    detecting, by a controller, an upcoming transmission of data packets to be transmitted through a physical layer of the chiplet;
    throttling a rate of bandwidth utilization in the physical layer based on a change in an amount of current drawn caused by transmitting the data packets through the physical layer; and
    transmitting, by the controller, a transmission of the data packets through the physical layer according to the throttling.

2. The method of claim 1, wherein throttling the rate of bandwidth comprises staging out a transmission of the data packets through the physical layer by at least one of:
    enabling a portion of circuitry of the physical layer; or
    increasing a transmission rate of the data packets through the physical layer.

3. The method of claim 2, wherein the staging out of the transmission of the data packets is performed in multiple stages, in each stage a portion of the data packets is transmitted at a rate that causes power consumption of a percentage of a maximum power level that can be consumed by the physical layer.

4. The method of claim 1, wherein throttling the rate of bandwidth comprises:
    enabling a portion of circuitry of the physical layer; and
    controlling the change in the amount of current drawn caused by transmitting the data packets through the physical layer such that a difference between a current drawn from a voltage rail of the chiplet by transmitting the data packets and a current drawn from the voltage rail by enabling the portion of circuitry is below a threshold.

5. The method of claim 4, wherein the enabling further comprises:
    generating a switching activity associated with transmission of dummy data packets through the physical layer, wherein the difference between current drawn from the voltage rail by the switching activity associated with the transmission of the data packets and current drawn from the voltage rail by the generated switching activity is below a second threshold.

6. The method of claim 5, further comprising:
    generating, by the controller, another switching activity associated with another transmission of other dummy data packets through the physical layer, the another switching activity being generated after the transmission of the data packets through the physical layer.

7. The method of claim 5, wherein an increase in the current drawn from the voltage rail is up to a predetermined percentage of the current drawn when transmitting the data packets through the physical layer.

8. The method of claim 5, wherein an increase in the current drawn from the voltage rail is up to a predetermined percentage of the current drawn at a maximum power level that can be consumed by the physical layer.

9. A system for controlling a voltage droop mitigation comprising:
    a chiplet comprising:
    circuitry of a physical layer;
    a voltage rail configured to supply power to the circuitry; and
    a controller, configured to:
    detect an upcoming transmission of data packets to be transmitted through the physical layer of the chiplet;
    throttle a rate of bandwidth utilization in the physical layer based on a change in an amount of current drawn caused by transmitting the data packets through the physical layer; and
    transmit a transmission of the data packets through the physical layer according to the throttle.

10. The system of claim 9, wherein the controller is configured to throttle the rate of bandwidth by staging out the transmission of the data packets through the physical layer by at least one of:
    enabling a portion of circuitry of the physical layer; or
    increasing a transmission rate of the data packets through the physical layer.

11. The system of claim 9, wherein the controller is configured to throttle the rate of bandwidth by:
  enabling a portion of circuitry of the physical layer; and
  controlling the change in the amount of current drawn caused by transmitting the data packets through the physical layer such that a difference between a current drawn from the voltage rail of the chiplet by transmitting the data packets and a current drawn from the voltage rail by enabling the portion of circuitry is below a threshold.

12. The system of claim 11, wherein the enabling further comprises:
  generating a switching activity associated with transmission of dummy data packets through the physical layer, wherein the difference between current drawn from the voltage rail by the switching activity associated with the transmission of the data packets and current drawn from the voltage rail by the generated switching activity is below a second threshold.

13. The system of claim 12, wherein the controller is further configured to:
  generate another switching activity associated with a second transmission of other dummy data packets through the physical layer, the another switching activity being generated after the transmission of the data packets through the physical layer.

14. A non-transitory computer-readable medium comprising hardware description language instructions describing a controller adapted to perform a method for voltage droop mitigation of a chiplet, the method comprising:
  detecting an upcoming transmission of data packets, the data packets are to be transmitted through a physical layer of the chiplet;
  throttling a rate of bandwidth utilization in the physical layer based on a change in an amount of current drawn caused by transmitting the data packets through the physical layer; and
  transmitting a transmission of the data packets through the physical layer according to the throttling.

15. The non-transitory computer-readable medium of claim 14, wherein throttling the rate of bandwidth comprises staging out transmission of the data packets through the physical layer by at least one of:
  enabling a portion of circuitry of the physical layer; or
  increasing a transmission rate of the data packets through the physical layer.

16. The non-transitory computer-readable medium of claim 14, wherein throttling the rate of bandwidth comprises:
  enabling a portion of circuitry of the physical layer; and
  controlling the change in the amount of current drawn caused by transmitting the data packets through the physical layer such that a difference between a current drawn from a voltage rail of the chiplet by transmitting the data packets and a current drawn from the voltage rail by enabling the portion of circuitry is below a threshold.

17. The non-transitory computer-readable medium of claim 16, wherein the enabling further comprises:
  generating a switching activity associated with transmission of dummy data packets through the physical layer, wherein the difference between current drawn from the voltage rail by the switching activity associated with the transmission of the data packets and current drawn from the voltage rail by the generated switching activity is below a second threshold.

18. The non-transitory computer-readable medium of claim 17, wherein an increase in the current drawn from the voltage rail is up to a predetermined percentage of the current drawn when transmitting the data packets through the physical layer.

19. The non-transitory computer-readable medium of claim 17, wherein an increase in the current drawn from the voltage rail is up to a predetermined percentage of the current drawn at a maximum power level that can be consumed by the physical layer.

20. The non-transitory computer-readable medium of claim 14, further comprising:
  generating another switching activity associated with transmission of other dummy data packets through the physical layer, the another switching activity being generated after the transmission of the data packets through the physical layer.

* * * * *